United States Patent
Kumamoto et al.

(10) Patent No.: US 11,347,197 B2
(45) Date of Patent: May 31, 2022

(54) SERVO MOTOR CONTROLLER

(71) Applicant: FANUC CORPORATION, Yamanashi (JP)

(72) Inventors: Yuuki Kumamoto, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/027,856

(22) Filed: Jul. 5, 2018

(65) Prior Publication Data

US 2019/0025792 A1 Jan. 24, 2019

(30) Foreign Application Priority Data

Jul. 19, 2017 (JP) .............................. JP2017-139811

(51) Int. Cl.
*G05B 15/02* (2006.01)
*G05B 19/23* (2006.01)
(Continued)

(52) U.S. Cl.
CPC ......... *G05B 19/232* (2013.01); *G05B 19/373* (2013.01); *G05B 19/404* (2013.01); *G05B 2219/41021* (2013.01)

(58) Field of Classification Search
CPC ........ G05B 19/232; G05B 2219/41021; G05B 2219/41022; G05B 2219/41028;
(Continued)

(56) References Cited

U.S. PATENT DOCUMENTS 4,819,184 A * 4/1989 Jonsson ............... G05B 19/373 700/250
6,316,903 B1 * 11/2001 Shamoto .............. G05B 19/416 318/700
(Continued)

FOREIGN PATENT DOCUMENTS

JP 63-109957 5/1988
JP 63-238602 10/1988
(Continued)

OTHER PUBLICATIONS

Notification of Reasons for Refusal dated Feb. 26, 2019 in Japanese Patent Application No. 2017-139811.
(Continued)

*Primary Examiner* — Muhammad S Islam
*Assistant Examiner* — Zemenay T Truneh
(74) *Attorney, Agent, or Firm* — . Wenderoth, Lind & Ponack, LLP

(57) ABSTRACT

A servo motor controller includes: a servo motor; a driven member which is driven by the servo motor and in which a load acting on a drive axis is varied depending on the position of the driven member; a position detection portion and a speed detection portion for the driven member; and a motor control portion, where the motor control portion includes: a position control portion which calculates a speed command based on a positional error between a position command for the driven member and the position FB; a speed control portion which calculates a torque command by multiplying a speed error between the speed command and the speed FB by a speed gain and/or adding a torque offset to the speed error; and a change portion which changes at least one of the speed gain and the torque offset according to the position of the driven member.

3 Claims, 3 Drawing Sheets

(51) Int. Cl.
*G05B 19/37* (2006.01)
*G05B 13/00* (2006.01)
*G05B 19/404* (2006.01)

(58) Field of Classification Search
CPC .......... G05B 2219/41026; G05B 2219/41029; G05B 19/404; G05B 19/373
USPC ................................ 318/619; 700/275, 250
See application file for complete search history.

(56) References Cited

U.S. PATENT DOCUMENTS

| | | | | |
|---|---|---|---|---|
| 2006/0158143 | A1* | 7/2006 | Okita | G05B 19/358 318/276 |
| 2011/0014001 | A1 | 1/2011 | Takahashi | |
| 2013/0264988 | A1* | 10/2013 | Iwashita | H02P 23/0077 318/568.1 |
| 2014/0292250 | A1* | 10/2014 | Hirose | G05B 11/01 318/619 |
| 2015/0205277 | A1* | 7/2015 | Igasaki | G05B 19/404 700/275 |

FOREIGN PATENT DOCUMENTS

| | | |
|---|---|---|
| JP | 6-155217 | 6/1994 |
| JP | 2002-178237 | 6/2002 |
| JP | 2005-056254 | 3/2005 |
| JP | 2005-182437 | 7/2005 |
| JP | 2008-119784 | 5/2008 |
| JP | 2008-171165 | 7/2008 |
| JP | 2011-140098 | 7/2011 |
| JP | 2015-015006 | 1/2015 |
| WO | 2009/110101 | 9/2009 |
| WO | 2016/135958 | 9/2016 |

OTHER PUBLICATIONS

Notification of Reasons for Refusal dated Jul. 2, 2019 in JP Patent Application No. 2017-139811.
Notification of Reasons for Refusal dated Nov. 17, 2020 in JP Patent Application No. 2017-139811.

* cited by examiner

SERVO MOTOR CONTROLLER

This application is based on and claims the benefit of priority from Japanese Patent Application No. 2017-139811, filed on 19 Jul. 2017, the content of which is incorporated herein by reference.

BACKGROUND OF THE INVENTION

Field of the Invention

The present invention relates to a servo motor controller which controls a servo motor for driving a driven member.

Related Art

For example, in a machine tool, a spindle unit which includes a spindle motor for driving a tool may be moved with a feed mechanism. A servo motor controller is known which controls a servo motor for driving the feed mechanism (driven member) as described above (see, for example, Patent Documents 1 to 3).

Patent Document 1: Japanese Unexamined Patent Application, Publication No. 2002-178237
Patent Document 2: Japanese Unexamined Patent Application, Publication No. H06-155217
Patent Document 3: PCT International Publication No. WO2016/135958

SUMMARY OF THE INVENTION

In the machine tool described above, depending on the position of the feed mechanism (driven member) (that is, the position of the spindle unit), a load (applied weight) acting on the drive axis of the feed mechanism may be varied by gravity or rotation. For example, as the load acting on the drive axis is increased, the feed mechanism reaches a target position later. In other words, the responsivity of the servo motor controller is lowered.

An object of the present invention is to provide a servo motor controller which reduces a decrease in responsivity caused by a variation in a load acting on the drive axis of a driven member.

(1) A servo motor controller (for example, a servo motor controller 1 which will be described later) according to the present invention includes: a servo motor (for example, a servo motor 400 which will be described later); a driven member (for example, a tilt mechanism 500 which will be described later) which is driven by the servo motor and in which a load acting on a drive axis (for example, a tilt axis X which will be described later) is varied depending on the position of the driven member; a position detection portion (for example, a encoder 300 which will be described later) which detects the position of the driven member; a speed detection portion (for example, an encoder 300 which will be described later) which detects the speed of the driven member; and a motor control portion (for example, a motor control portion 100 which will be described later) which controls the servo motor, where the motor control portion includes: a position control portion (for example, a position control portion 20 which will be described later) which calculates a speed command based on a positional error between a position command for the driven member and position feedback detected by the position detection portion; a speed control portion (for example, a speed control portion 30 which will be described later) which calculates a torque command by multiplying a speed error between the speed command calculated by the position control portion and speed feedback detected by the speed detection portion by a speed gain and/or adding a torque offset to the speed error; and a change portion (for example, a change portion 60 which will be described later) which changes at least one of the speed gain and the torque offset according to the position of the driven member.

(2) In the servo motor controller according to (1), the change portion may use, as the position of the driven member, the position feedback detected by the position detection portion.

(3) In the servo motor controller according to (1), the change portion may use, as the position of the driven member, the position command for the driven member.

(4) In the servo motor controller according to any one of (1) to (3), the driven member may be driven to rotate by the servo motor, and the change portion may use the angle of rotation of the driven member as the position of the driven member.

(5) In the servo motor controller according to any one of (1) to (4), the driven member may include a spindle unit (for example, a spindle unit 510 which will be described later) including a spindle motor for driving a tool in a machine tool.

According to the present invention, it is possible to provide a servo motor controller which reduces a decrease in responsivity caused by a variation in a load acting on the drive axis of a driven member.

DETAILED DESCRIPTION OF THE INVENTION

Figure 1:
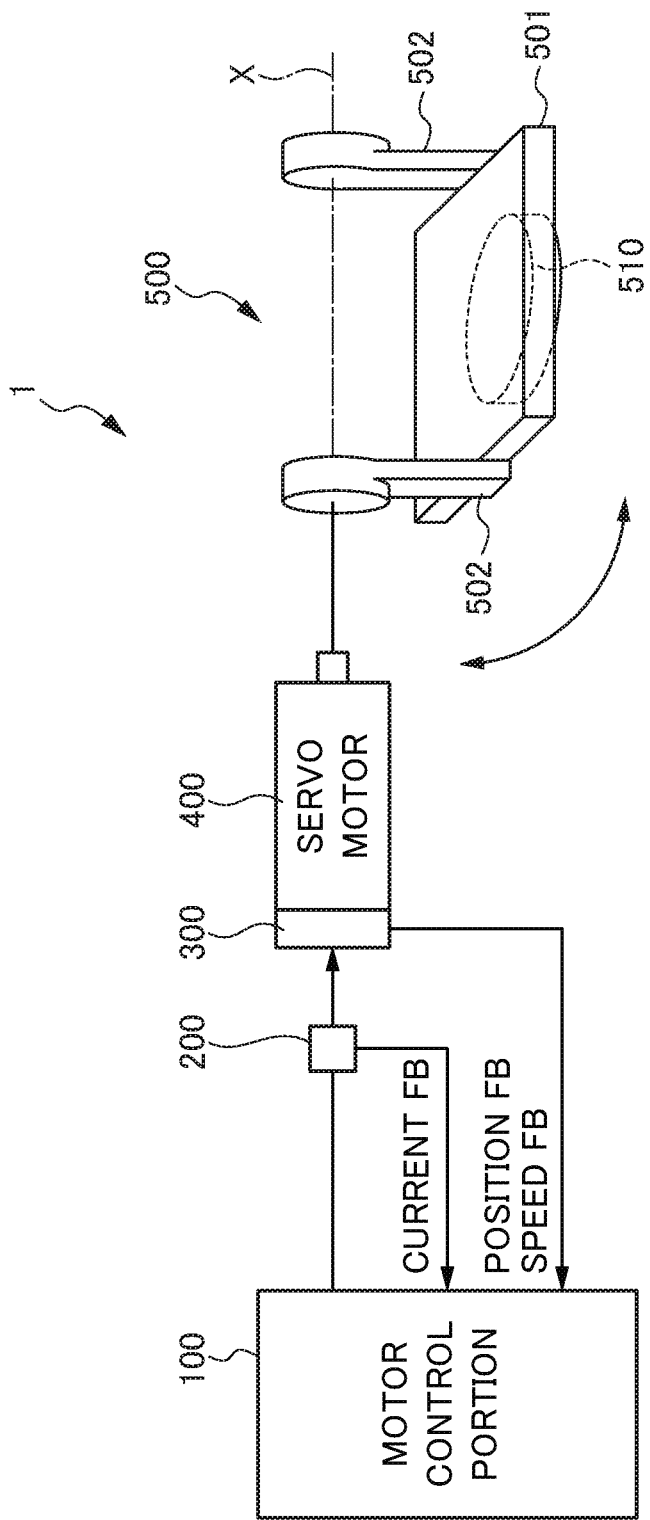
FIG. 1 is a diagram showing the configuration of a servo motor controller according to the present embodiment.

Examples of the embodiment of the present invention will be described below with reference to accompanying drawings. In the drawings, the same or corresponding portions are identified with the same reference numerals.

First Embodiment

FIG. 1 is a diagram showing the configuration of a servo motor controller according to the present embodiment. The servo motor controller 1 shown in FIG. 1 includes a motor control portion 100, a current detector 200, an encoder (position detection portion, speed detection portion) 300, a servo motor 400 and a tilt mechanism 500.

The motor control portion 100 controls the servo motor 400 which drives the tilt mechanism (driven member) 500 including a spindle unit 510 in a machine tool. The details of the motor control portion 100 will be described later.

The current detector 200 is, for example, a current transformer. The current detector 200 detects the drive current of the servo motor 400. The detected current is utilized as current feedback (current FB).

The encoder 300 is provided in the servo motor 400, and detects the rotation position of the servo motor 400. The rotation position of the servo motor 400 corresponds to the position of the tilt mechanism 500, and thus the encoder 300 detects the position of the tilt mechanism 500 (machine coordinates, that is, a tilt angle (angle of rotation)). The detected position is utilized as position feedback (position FB). The encoder 300 also detects the rotation speed of the servo motor 400. The rotation speed of the servo motor 400 corresponds to the speed of the tilt mechanism 500, and thus the encoder 300 detects the speed of the tilt mechanism 500. The detected speed is utilized as speed feedback (speed FB).

The tilt mechanism 500 is driven to rotate by the servo motor 400 so as to tilt the spindle unit 510 including a spindle motor for driving a tool in the machine tool. The tilt mechanism 500 is formed with, for example, a base member 501 to which the spindle unit 510 in the machine tool is attached and arms 502 in which the base member 501 is supported on one end side and which have a tilt axis (rotary axis) X on the other end side. In this way, the tilt mechanism 500 has an asymmetric configuration with respect to the tilt axis X.

Figure 2:
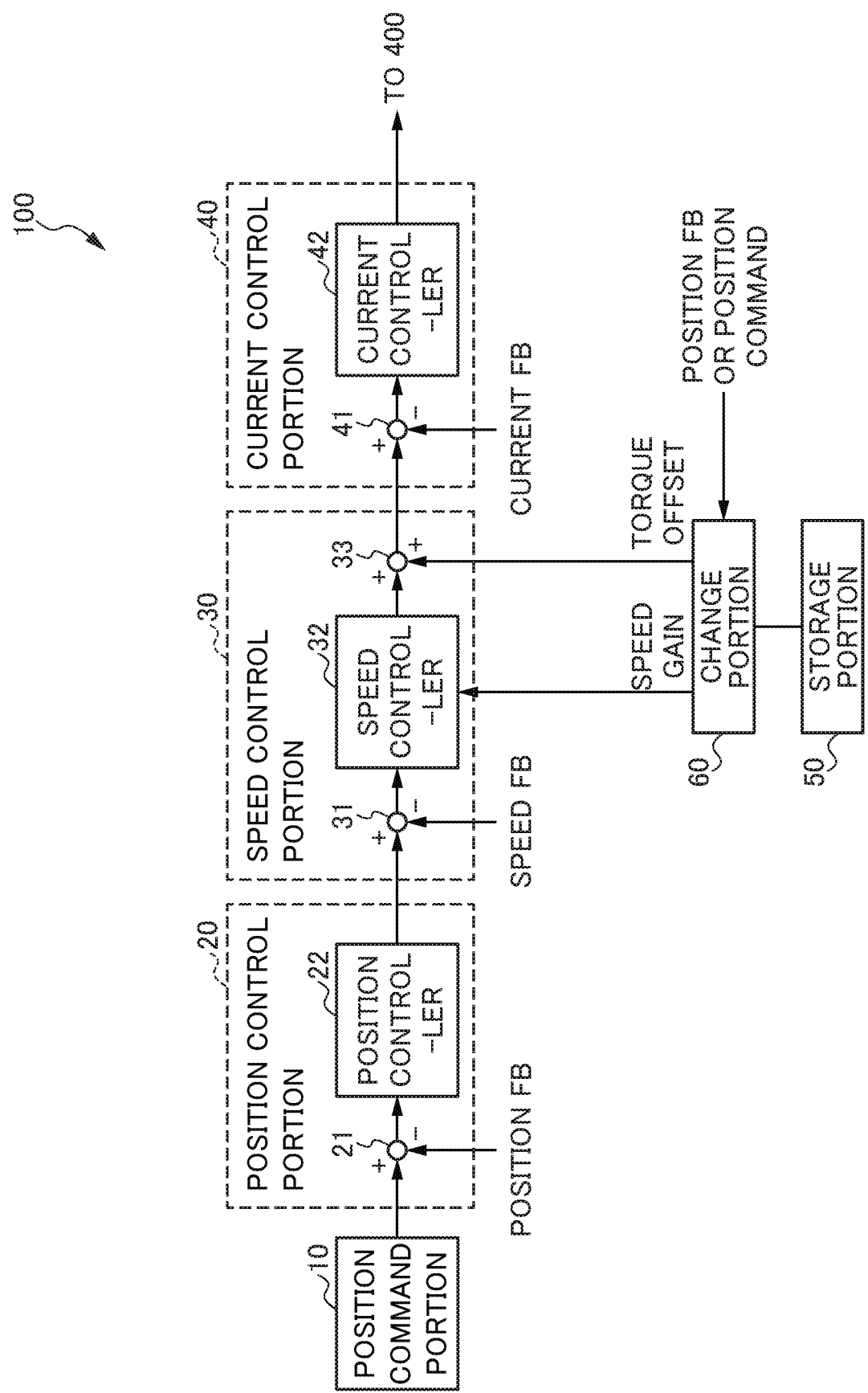
FIG. 2 is a diagram showing the configuration of a motor control portion shown in FIG. 1.

The motor control portion 100 will then be described with reference to FIG. 2. FIG. 2 is a diagram showing the configuration of the motor control portion 100 shown in FIG. 1. The motor control portion 100 includes a position command portion 10, a position control portion 20, a speed control portion 30, a current control portion 40, a storage portion 50 and a change portion 60.

The position command portion 10 calculates a position command for the servo motor 400, that is, a position command for the tilt mechanism 500 according to a program or a command input from an unillustrated higher controller, an external input device or the like.

The position control portion 20 calculates a speed command based on the position command calculated by the position command portion 10 and the position FB detected by the encoder 300. The position control portion 20 includes a subtractor 21 and a position controller 22. The subtractor 21 determines a positional error between the position command calculated by the position command portion 10 and the position FB detected by the encoder 300. The position controller 22 multiplies the positional error determined by the subtractor 21 by a position gain so as to calculate the speed command.

The speed control portion 30 calculates a torque command based on the speed command calculated by the position control portion 20, the speed FB detected by the encoder 300 and a speed gain and a torque offset from the change portion 60. The speed control portion 30 includes a subtractor 31, a speed controller 32 and an adder 33. The subtractor 31 determines a speed error between the speed command calculated by the position control portion 20 and the speed FB detected by the encoder 300. The speed controller 32 multiplies the speed error determined by the subtractor 31 by the speed gain from the change portion 60. The adder 33 adds the torque offset from the change portion 60 to a multiplication value obtained by the multiplication in the speed controller 32, and thereby calculates the torque command. The speed control portion 30 may calculate the torque command based on the speed command, the speed FB and the speed gain without provision of the adder 33.

The current control portion 40 calculates the drive current of the servo motor 400 based on the torque command calculated by the speed control portion 30 and the current FB detected by the current detector 200. The current control portion 40 includes a subtractor 41 and a current controller 42. The subtractor 41 calculates a torque error between the torque command calculated by the speed control portion 30 and the current FB detected by the current detector 200. The current controller 42 multiplies the torque error determined by the subtractor 41 by a torque gain so as to calculate the drive current. The calculated drive current is supplied to the servo motor 400.

Figure 3:
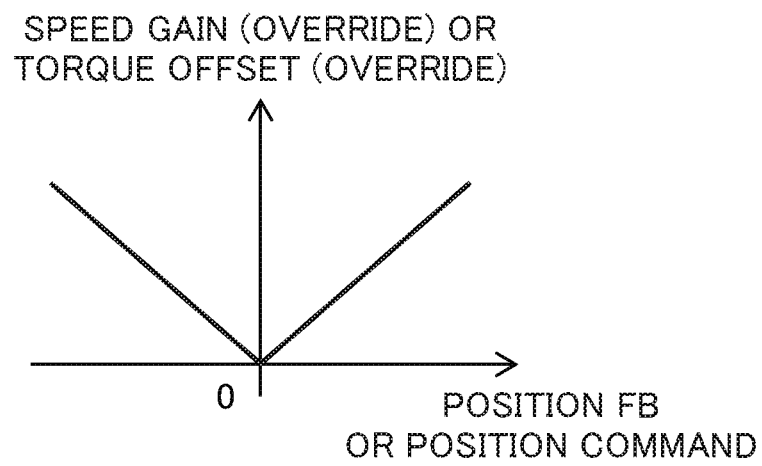
FIG. 3 is a diagram showing an example of a function (data table) stored in a storage portion.

The storage portion 50 stores the predetermined speed gain (fixed value) and the predetermined torque offset (fixed value). The storage portion 50 also stores an override for changing the predetermined speed gain. Specifically, as shown in FIG. 3, the storage portion 50 stores a function in which the position FB (the position of the tilt mechanism 500) is an input and in which the override of the speed gain corresponding to the input position FB is an output. Specifically, the storage portion 50 stores, as the function, a data table in which the position FB and the override of the speed gain are associated with each other. In FIG. 3, a setting is made such that as the position of the tilt mechanism 500 indicated by the position FB is moved away from a position (0) in a vertical direction, the override of the speed gain is increased substantially proportionally. The storage portion 50 is, for example, a rewritable memory such as an EEPROM.

The change portion 60 changes the speed gain according to the position FB (the position of the tilt mechanism 500) detected by the encoder 300, and supplies the changed speed gain and the predetermined torque offset to the speed control portion 30. Specifically, the change portion 60 derives, from the function stored in the storage portion 50, the override of the speed gain corresponding to the position FB. Specifically, the change portion 60 references the data table so as to determine the override of the speed gain according to the position FB. Then, the change portion 60 multiplies the predetermined speed gain (fixed value) stored in the storage portion 50 by the derived override so as to change the speed gain. The change portion 60 sets the predetermined torque offset (fixed value) stored in the storage portion 50 to the torque offset.

The motor control portion 100 is formed with, for example, a computation processor such as a DSP (Digital Signal Processor) or an FPGA (Field-Programmable Gate Array). The various types of functions (the position command portion 10, the position control portion 20, the speed control portion 30, the current control portion 40 and the change portion 60) in the motor control portion 100 are realized, for example, by executing predetermined software (programs) stored in the storage portion 50. The various types of functions in the motor control portion 100 may be realized by cooperation of hardware and software or may be realized only by hardware (electronic circuit).

Here, depending on the position of the tilt mechanism 500 (that is, the position of the spindle unit), a load (applied weight (moment)) acting on the tilt axis X of the tilt mechanism 500 is varied by gravity or rotation of the spindle unit 510. For example, as the load acting on the tilt axis X is increased, a drive force becomes insufficient, and thus the tilt mechanism 500 reaches a target position later. In other words, the responsivity of the servo motor controller 1 is lowered. In this point, it can be considered that the speed gain is set to a large value so as to enhance the responsivity. However, the speed gain is constantly set large, and thus oscillation (vibration) occurs when the load is light. In other words, the stability of the servo motor controller 1 is lowered.

Hence, in the servo motor controller 1 of the present embodiment, the change portion 60 changes the speed gain according to the position of the tilt mechanism (driven member) 500. In this way, when the load acting on the tilt axis X is increased, the speed gain is increased, and the drive current is increased, with the result that it is possible to increase the drive force. Hence, it is possible to reduce the failure in which the tilt mechanism 500 reaches the target position later. In other words, it is possible to reduce a decrease in responsivity caused by a variation in the load acting on the drive axis X of the tilt mechanism 500. Furthermore, when the load acting on the tilt axis X is reduced, the speed gain is reduced, and thus it is possible to reduce oscillation (vibration). In this way, it is possible both to reduce a decrease in responsivity and to reduce a decrease in stability caused by a variation in the load acting on the tilt axis X of the tilt mechanism 500.

First Variation in First Embodiment

Although in the first embodiment, the change portion 60 changes the speed gain according to the position FB (the position of the tilt mechanism 500) detected by the encoder 300, instead of the position FB, the speed gain may be changed according to the position command (the position of the tilt mechanism 500) calculated by the position command portion 10.

In this case, as shown in FIG. 3, the storage portion 50 stores a function in which the position command (the position of the tilt mechanism 500) is an input and in which the override of the speed gain corresponding to the input position command is an output. Specifically, the storage portion 50 stores, as the function, a data table in which the position command and the override of the speed gain are associated with each other. In FIG. 3, a setting is made such that as the position of the tilt mechanism 500 indicated by the position command is moved away from the position (0) in the vertical direction, the override of the speed gain is increased substantially proportionally.

The change portion 60 derives, from the function stored in the storage portion 50, the override of the speed gain corresponding to the position command. Specifically, the change portion 60 references the data table so as to determine the override of the speed gain according to the position command. Then, the change portion 60 multiplies the predetermined speed gain (fixed value) stored in the storage portion 50 by the derived override so as to change the speed gain.

Second Variation in First Embodiment

Although in the first embodiment, the storage portion 50 stores the predetermined speed gain (fixed value) and the override for changing the predetermined speed gain, the storage portion 50 may store a plurality of speed gains (variable values). Specifically, as shown in FIG. 3, the storage portion 50 stores a function in which the position FB or the position command is an input and in which the speed gain corresponding to the position FB or the position command input is an output. Specifically, the storage portion 50 stores, as the function, a data table in which the position FB or the position command and the speed gain are associated with each other. In FIG. 3, a setting is made such that as the position of the tilt mechanism 500 indicated by the position FB or the position command is moved away from the position (0) in the vertical direction, the speed gain is increased substantially proportionally.

The change portion 60 derives, from the function stored in the storage portion 50, the speed gain corresponding to the speed FB or the position command. Specifically, the change portion 60 references the data table so as to determine the speed gain according to the speed FB or the position command.

Second Embodiment

In the first embodiment, the speed gain is changed. In a second embodiment, instead of the speed gain, the torque offset is changed.

The configuration of a servo motor controller 1 according to the second embodiment is the same as that of the servo motor controller 1 in the first embodiment shown in FIGS. 1 and 2. In the servo motor controller 1 according to the second embodiment, the function of the change portion 60 and the function (table) stored in the storage portion 50 differ from those in the servo motor controller 1 of the first embodiment.

Instead of the override for changing the predetermined speed gain, the storage portion 50 stores an override for changing the predetermined torque offset. Specifically, as shown in FIG. 3, the storage portion 50 stores a function in which the position FB (the position of the tilt mechanism 500) is an input and in which the override of the torque offset corresponding to the input position FB is an output. Specifically, the storage portion 50 stores, as the function, a data table in which the position FB and the override of the torque offset are associated with each other. In FIG. 3, a setting is made such that as the position of the tilt mechanism 500 indicated by the position FB is moved away from the position (0) in the vertical direction, the override of the torque offset is increased substantially proportionally.

The change portion 60 changes the torque offset according to the position FB (the position of the tilt mechanism 500) detected by the encoder 300, and supplies the changed torque offset and the predetermined speed gain to the speed control portion 30. Specifically, the change portion 60 derives, from the function stored in the storage portion 50, the override of the torque offset corresponding to the position FB. Specifically, the change portion 60 references the data table so as to determine the override of the torque offset according to the position FB. Then, the change portion 60 multiplies the predetermined torque offset (fixed value) stored in the storage portion 50 by the derived override so as to change the torque offset. The change portion 60 sets the predetermined speed gain (fixed value) stored in the storage portion 50 to the speed gain.

Here, for example, it is assumed that as the load acting on the tilt axis X is increased, the output torque is increased, and thus it takes more time to increase an integrator in the speed control portion 30 to an amount corresponding to the increase in the output torque. In other words, the responsivity of the servo motor controller 1 is lowered.

Hence, in the servo motor controller 1 of the present embodiment, the change portion 60 changes the torque offset according to the position of the tilt mechanism (driven member) 500. In this way, when the load acting on the tilt axis X is increased, the torque offset is increased, and thus it is possible to reduce an increase in the integrator in the speed control portion 30 up to an amount necessary to output a torque corresponding to the torque offset. In other words, it is possible to reduce a decrease in responsivity caused by a variation in the load acting on the drive axis X of the tilt mechanism 500.

First Variation in Second Embodiment

Although in the second embodiment, the change portion 60 changes the torque offset according to the position FB (the position of the tilt mechanism 500) detected by the encoder 300, instead of the position FB, the speed gain may be changed according to the position command (the position of the tilt mechanism 500) calculated by the position command portion 10.

In this case, as shown in FIG. 3, the storage portion 50 stores a function in which the position command (the position of the tilt mechanism 500) is an input and in which the override of the torque offset corresponding to the input position command is an output. Specifically, the storage portion 50 stores, as the function, a data table in which the position command and the override of the torque offset are associated with each other. In FIG. 3, a setting is made such that as the position of the tilt mechanism 500 indicated by the position command is moved away from the position (0) in the vertical direction, the override of the torque offset is increased substantially proportionally.

The change portion 60 derives, from the function stored in the storage portion 50, the override of the torque offset corresponding to the position command. Specifically, the change portion 60 references the data table so as to determine the override of the torque offset according to the position command. Then, the change portion 60 multiplies the predetermined torque offset (fixed value) stored in the storage portion 50 by the derived override so as to change the torque offset.

Second Variation in Second Embodiment

Although in the second embodiment, the storage portion 50 stores the predetermined torque offset (fixed value) and the override for changing the predetermined torque offset, the storage portion 50 may store a plurality of torque offsets (variable values). Specifically, as shown in FIG. 3, the storage portion 50 stores a function in which the position FB or the position command is an input and in which the torque offset corresponding to the position FB or the position command input is an output. Specifically, the storage portion 50 stores, as the function, a data table in which the position FB or the position command and the torque offset are associated with each other. In FIG. 3, a setting is made such that as the position of the tilt mechanism 500 indicated by the position FB or the position command is moved away from the position (0) in the vertical direction, the torque offset is increased substantially proportionally.

The change portion 60 derives, from the function stored in the storage portion 50, the torque offset corresponding to the speed FB or the position command. Specifically, the change portion 60 references the data table so as to determine the torque offset according to the speed FB or the position command.

Although the embodiments of the present invention are described above, the present invention is not limited to the embodiments described above. The effects described in the present embodiment are simply a list of most preferred effects calculated from the present invention, and the effects of the present invention are not limited to those described in the present embodiment.

For example, the embodiments described above may be modified as necessary or may be practiced by being combined. For example, the first embodiment and the second embodiment may be combined such that both the speed gain and the torque offset are changed according to the position FB or the position command.

In the embodiments described above, the servo motor controller which drives and controls the tilt mechanism (rotary mechanism) for tilting (rotating) the spindle unit in the machine tool is illustrated. However, the feature of the present invention is not limited to this configuration, and can be applied to a servo motor controller that drives and controls various driven members in which a load (applied weight (moment)) acting on a drive axis is varied depending on the positions of the driven members. For example, the feature of the present invention can also be applied to a slide mechanism which slides a spindle unit in a machine tool. The feature of the present invention can also be applied to a servo motor controller which drives and controls a driven member in an industrial machine or the like.

EXPLANATION OF REFERENCE NUMERALS

1 servo motor controller
10 position command portion
20 position control portion
21 subtractor
22 position controller
30 speed control portion
31 subtractor
32 speed controller
33 adder
40 current control portion
41 subtractor
42 current controller
50 storage portion
60 change portion
100 motor control portion
200 current detector (current detection portion)
300 encoder (position detection portion, speed detection portion)
400 servo motor
500 tilt mechanism (driven member)
510 spindle unit
501 base member
502 arm

What is claimed is:
1. A servo motor controller comprising: a servo motor;
a driven member which is driven by the servo motor and in which a load acting on a drive axis is varied depending on a position of the driven member;
a detection portion which detects the position of the driven member and which detects a speed of the driven member;
a motor control portion which controls the servo motor, wherein the motor control portion includes:
a position control portion which calculates a speed command based on a positional error between a position command for the driven member and position feedback detected by the detection portion;
a speed control portion which calculates a torque command by multiplying a speed error between the speed command calculated by the position control portion and speed feedback detected by the detection portion by a speed gain and adding a torque offset to the speed error;
a storage portion which stores a function having a position value associated with the driven member as an input, and a speed gain value and a torque offset value corresponding to the input position value as an output;
a change portion which derives, from the function stored in the storage portion, an override of the speed gain corresponding to the position feedback detected by the detection portion,
wherein the change portion multiples the speed gain value stored in the storage portion by the derived override so as to change the speed gain utilized by the speed control portion to calculate the torque command, and wherein the change portion sets the torque offset value stored in the storage portion as the torque offset utilized by the speed control portion to calculate the torque command.

2. The servo motor controller according to claim 1, wherein the driven member is driven to rotate by the servo motor, and
the change portion uses an angle of rotation of the driven member as the position of the driven member.

3. The servo motor controller according to claim 1, wherein the driven member includes a spindle unit including a spindle motor for driving a tool in a machine tool.

* * * * *